Patented Apr. 20, 1937

2,077,884

UNITED STATES PATENT OFFICE 2,077,884

LIGNIN SULPHONIC ACID MOLDING COMPOSITIONS AND METHOD OF TREATING SAME

Guy C. Howard and Lloyd T. Sandborn, Wausau, Wis., assignors to Marathon Paper Mills Company, Rothschild, Wis., a corporation of Wisconsin, and Guy C. Howard Company, Rothschild, Wis., a corporation of Washington No Drawing. Application July 19, 1934, Serial No. 736,040

26 Claims. (Cl. 18—47.5)

This invention relates to the use of lignin-sulphonic acid compounds in making molded products. It has for its object the preparation of new and useful molding compositions and molded products containing such compounds.

In making paper pulp by the sulphite process wood is given a pressure cook with a solution of a bisulphite salt and free sulphurous acid. This converts the lignin substance into a lignin-sulphonic acid compound, and other reactions on the wood constituents occur with the result that the lignin and other non-cellulose constituents are dissolved, leaving a cellulose pulp.

When a mixture of such lignin-sulphonic acid compound and the other non-cellulose constituents, as obtained by evaporating the waste sulphite liquor, is used in a molding composition and molded under pressure and heat in the presence of a plasticizing agent such as water, the resulting molded product is inferior in water resistance and certain other respects to the molded products of the present invention.

United States Patent Reissue No. 18,268 discloses one method by which the waste sulphite liquor can be treated with caustic lime to precipitate a calcium salt of lignin-sulphonic acid substantially freed from the non-ligneous organic matter of such liquor. Such precipitated lignin-sulphonic acid compound is found to be sulphonated to the extent of approximately 32 parts of sulphur in the sulphonic group to 600 parts of lignin substance which represents a normal degree of sulphonation for such compound when precipitated at a temperature not exceeding 100° C. It is alkaline with caustic lime and its total lime content is in large excess over that required to form a salt with the sulphonic group present. Normally it will analyze somewhat over 20% ash by ignition. It is dispersible in water on lowering its alkalinity, and is readily soluble in dilute acids or in solutions of caustic soda or various salts.

When a composition containing this precipitated lignin-sulphonic acid compound, with some water as a plasticizing agent is subjected to heat and pressure in a closed mold and at a temperature above 100° C. it yields a product which is somewhat better than those obtained when using all the constituents of the waste sulphite liquor in the composition but is still deficient in water and acid resistance. Treating this precipitated compound under heat and pressure at a temperature above 100° C. in the presence of moisture is to some degree a heat treatment of the material under alkaline conditions as discussed later and tends to alter the lignin-sulphonic acid compound to a more water and acid insoluble form but it may not be practical in the molding operation to carry such alteration to the full extent desired, nor to avoid the presence of water soluble matter and inorganic ash constituents in the resulting product.

United States Patent No. 1,848,292 discloses an alkaline pressure cooking treatment of such precipitated lignin-sulphonic acid compound whereby it can be converted to various other lignin-sulphonic acid compounds which are more insoluble in water and acids. Such conversion is accompanied with more or less de-sulphonation and with some organic alterations in the lignin complex itself. The extent of the de-sulphonation and the organic alteration depends on specific conditions of pressure, temperature, time of treatment and amount of available alkalinity and can be readily controlled to yield various degrees of sulphonation between a condition represented by 32 parts of sulphur in the sulphonic group to 600 parts of lignin substance and 32 parts of sulphur to 2000 or even more parts of lignin. The solubility characteristics are also dependent on the conditions of treatment and in general show reduced solubility in water and acids with a lower degree of sulphonation. Those which are sufficiently de-sulphonated are insoluble enough to allow of leaching with dilute acids, for example sulphurous or hydrochloric, whereby inorganic constituents are removed in the form of soluble salts for example as calcium bisulphite or calcium chloride, and both ash-forming constituents and water-soluble organic matter are thus removed.

We have discovered that the solid lignin-sulphonic acid compounds resulting from such alkaline heat treatment of the precipitated lignin-sulphonic acid compound and separation from the soluble organic matter in the residual mother liquor and preferably after they have been leached with sulphurous acid can be very advantageously used in molding compositions to yield useful molded products having good water and acid resistance and other desirable properties and that their moldability can be controlled by the specific conditions of their preparation to produce various property characteristics in the final molded product.

For example when the above mentioned caustic lime precipitate of lignin-sulphonic acid compound is cooked at 50 lb. steam pressure (140–145° C.) for four hours, and then leached with dilute sulphurous acid, the powdery material which is obtained contains approximately 32 parts of sulphur in the sulphonic group to 950 parts of lignin substance. When molding compositions containing this material with for example 10% water as a plasticizing agent and with a filler, are heated at 150–160° C. under 2000 lbs. pressure per square inch in a closed mold the lignin-sulphonic acid compound is quickly transformed to a plastic, resin-like mass which flows readily to take the shape of the mold and which can be extruded from the mold in the form of rods, tubes and other shapes. When the composition does not contain a filler constituent the resultant product is a hard, dense, vitreous or resin-like material which is rather brittle but practically insoluble and non-bleeding in water and acids. When filler constituents are used the resulting molded and extruded articles contain vitreous or resin-like material and are hard, dense, strong, tough and practically insoluble and non-bleeding in water and acids altho they are capable of absorbing small amounts of water and this absorption is accompanied by a slight swelling.

When the pressure of the alkaline cook is increased from 50 lb. (140–145° C.) to 130–135 lb. steam pressure (175–180° C.) and the material leached as described above the resulting powdery solid contains approximately 32 parts of sulphur to 1600 parts of lignin substance. In comparing molding compositions made from this material with that described above we find that they are slightly less plastic when molded under equivalent conditions but that the resulting molded articles, in addition to being practically insoluble and non-bleeding in water and acids show practically no absorption or swelling on immersion in water, and are also hard, strong, dense and tough.

Moreover, compounds made by cooking at temperatures intermediate to those cited show the expected variations in properties. In general, as the temperature of the cooking treatment is increased within these specified limits, there is a tendency for decreased plasticity in subsequently prepared molding compositions and an increase in the water resistance of molded articles made from such compositions.

We have also found a similar influence of the time of cooking at any one temperature and pressure. In general the effect of increasing the time of the cook from 1 to 4 hours imparts the same trends in properties as increasing the temperature or pressure of cooking.

The discoveries disclosed above may advantageously be utilized in preparing molding compositions for specific uses. In molding articles of simple shape where extremely good water resistance is desired we prefer to use the lignin-sulphonic acid compounds prepared at higher temperatures, but in cases where greater plasticity is desired we may substitute a material made at lower temperature. The desired range in properties may also be obtained by mixing materials made under different conditions.

In accordance with United States patent application Serial No. 663,180 we may apply to this aforesaid precipitated lignin-sulphonic acid compound a pressure cooking treatment under strong caustic soda alkalinity, whereby an acid insoluble lignin-sulphonic acid compound is obtained as one of the products. Such last named compound is preferably obtained by adding dilute sulphuric acid and sodium sulphate in controlled amounts to the aforesaid precipitated lignin-sulphonic acid compound whereby it is dissolved as its sodium salt and most of the calcium is precipitated and removed as calcium sulphate, adding the desired amount of caustic soda to the resultant solution, and pressure cooking it with steam, acidifying the solution product with sulphurous acid to precipitate the desired acid insoluble lignin-sulphonic acid compound, separating the solids from residual mother liquor and partially drying the resultant solid compound. Such recovered compound is similar in some respects to, but not identical with, the previously described acid insoluble lignin-sulphonic acid compounds obtained by pressure cooking under caustic lime alkalinity since it is de-sulphonated to a greater extent and normally contains 32 parts of sulphur to 2000–3000 parts of lignin substance and the organic alterations to the lignin complex appear to be different in character or extent. We have discovered that such lignin-sulphonic acid compounds obtained by pressure cooking under caustic soda alkalinity can also be advantageously used in molding compositions.

For example, when such a solution of the aforesaid precipitated lignin-sulphonic acid compound is pressure cooked under conditions of strong caustic soda alkalinity at 130–140 lbs. steam pressure for one hour, the resultant solution acidified, the precipitated solids separated from the mother liquor and partially dried, it yields a powdery lignin-sulphonic acid compound which is acid insoluble. When molding compositions containing this powdery compound with for example 6% water as a plasticizing agent and a filler are molded in a closed mold under 2000 lbs. pressure per square inch and at a temperature of 150–160° C. the lignin-sulphonic acid compound will change quickly from a powder to a vitreous, or vitrified or resin-like condition and flow into the shape of the mold. When no fillers are used in such composition the resultant product is a hard, dense, vitreous or vitrified or resin-like material which is rather brittle but practically insoluble and non-bleeding in water and acids. When filler constituents are used in the composition the resultant molded products contain vitreous or resin-like material and are hard, dense, strong, tough, and practically unaffected by immersion in water. In comparison with the above cited lignin-sulphonic acid compounds made under conditions of caustic lime alkalinity this compound made with caustic soda is more plastic—even with a smaller amount of water used as the plasticizing agent.

We preferably leach these lignin-sulphonic acid compounds after the alkaline pressure cooking with sulphurous or other dilute acids of similar strength suitable to remove practically all the base, e. g. lime, save that required to form a salt with the sulphonic group present since we find it unnecessary to decompose the sulphonic acid salt into its free acid form as would result when leaching with stronger acid, such as hydrochloric unless used in more carefully controlled amounts. The purpose of the acid leaching is primarily to minimize the amount of inorganic impurities, i. e. ash forming constituents, in the final molding material but this leaching also serves to remove soluble organic matter. We prefer to avoid too acid conditions in our molding compositions and may, if desired, raise the pH conditions of an acid leached product by subsequently adding a controlled amount of alkali, e. g. NaOH, to it.

We do not desire to limit the preparation of lignin-sulphonic acid compounds suitable for use in molding compositions to a pressure cooking of this precipitated lignin material as hereinbefore disclosed. When it is heated about 100° C. at atmospheric pressure under alkaline conditions it will yield partially de-sulphonated lignin-sulphonic acid compounds which are acid insoluble and moldable with a plasticizer under heat and pressure to yield similar vitreous or resin-like material with desirable properties. Furthermore as noted above, similar alterations can be brought about to some extent by molding the alkaline precipitation lignin material without such preliminary heating treatments but with inferior results as regards the quality of the molded product.

We do not wish to limit ourselves to water as the plasticizing agent for we have found that some non-aqueous solvents such as glycerol and xylenol and similar alcohols or phenols can also be used. In using glycerol as the plasticizing agent, its non-volatility permits of safer preheating of the molding composition and allows the opening of the mold at a higher temperature without rupturing the molded article due to escape of volatile matter. The same is true of phenols having a high boiling point, for example, xylenol. It is possible to use mixtures of various plasticizing agents if so desired. Some of these non-aqueous plasticizers may react chemically with the lignin compound without their plasticizing action being destroyed.

Some of the characteristics and advantages of these lignin-sulphonic acid compounds which render them particularly useful in making molding compositions are as follows: They are substantially free from the relatively soluble non-ligneous constituents of ligno-cellulose material and are therefore more water resistant than the solids obtained on evaporating waste sulphite liquor. By an alkaline heat treatment the sulphur content of the material can be materially reduced and the solubility of the resulting lignin-sulphonic acid compound reduced correspondingly, ranging from slight water solubility at a ratio of 32 parts of sulphur to 950 parts of lignin substance to practical insolubility at 32 parts of sulphur to 1500 parts of lignin substance. Such lignin substances are powdery—even when containing 10–15% water, and are readily adapted by mixing with plasticizers, with or without fillers, to form apparently homogeneous molding compositions. When such molding compositions contain no plasticizer they are not moldable, but they are capable of being plasticized with water or equivalent plasticizing agents when heated under pressure in a closed mold. We believe that this plasticity is due to a tendency for the lignin-sulphonic acid compounds to dissolve in the plasticizer at this elevated temperature and that in such dissolved state they assume the characteristics of a thermoplastic resin and flow to take the shape of the mold. On cooling to a suitable temperature and releasing the pressure, the material is no longer plastic, but it remains vitrified or resin-like in appearance—even if the plasticizer is removed, e. g. by heating the unconfined molded article. When non-volatile or high-boiling point solvents, such as glycerol or xylenol are used as the plasticizing agent, the molding composition can be preheated to minimize the time of actual molding without escape of plasticizer.

Molded articles which have the following useful properties can be made from compositions containing the above disclosed lignin-sulphonic acid compounds, a plasticizing agent and a filler: They are hard, strong, tough, dense and resistant to water, acids and organic solvents. They can be sawed or machined. They will retain these characteristics—even if the plasticizer is removed, e. g. by heating. Molded articles made in accordance with our invention from compositions containing volatile plasticizers are not plastic at ordinary temperature or under conditions of normal usage and in this respect have the favorable properties of articles made from "heat setting" resins. This valuable characteristic is believed to be due to the fact that the volatile plasticizer can escape at temperatures lower than that at which the material becomes plastic. Inasmuch as these materials are not "heat setting" they can be remolded provided a suitable amount of plasticizer is present during remolding. This characteristic makes the reuse of scrap material possible and makes these compositions readily adaptable to extrusion as well as other kinds of molding. It also makes it possible to vitrify the powdery lignin-sulphonic acid material prior to mixing it with a filler to form the molding composition, for example, by extruding it under heat and pressure with a water plasticizer; then pulverizing and drying to the desired moisture content and finally mixing with the filler constituent.

The amount of plasticizing agent used is also a vital factor as regards both the moldability and the properties of the molded product. If too much water is used the plasticity is increased but the resultant vitreous molded product is inferior in desired properties and if too little is used the desired vitreous or vitrified condition is not attained uniformly throughout the molded product. For example we find the optimum amounts of water for best results with these lignin-sulphonic acid compounds apparently lies between a maximum of 20% and a minimum of 2% based on the weight of the molding composition, and that the optimum varies with specific lignin compounds, the type of filler and the specific molding condition. The optimum amount of other plasticizing agents, such for example as glycerol, or xylenol, lies roughly within the same range but is not always the same as with water for any specified compound. In principle the amount of plasticizing agent is kept at the practical minimum which will yield the desired vitrified or resin-like condition uniformly throughout the molded product but may be increased or reduced within practical limits to obtain specific results. It is also to be noted as indicated above, that specific properties and the actual composition of the vitrified or resin-like material and hence of the resultant molded product will depend more or less on the kind and amount of plasticizer used. The optimum molding conditions as regards temperature, pressure and time will vary somewhat with specific compositions.

As the filler constituents for our molding compositions we find that fillers such as wood flour, asbestos, and the other materials commonly used in the molding of compositions under heat and pressure conditions are suitable. While these lignin-sulphonic acid compounds and a plasticizer are moldable without a filler to give a vitreous or resin-like hard, dense product which is water and acid resistant, such products are inferior in strength and toughness to those obtained when suitable fillers are used.

We observe there is a very considerable volume shrinkage when these lignin-sulphonic acid compounds change to a vitreous or resin-like condition on molding under heat and pressure with a plasticizer and that equivalent vitrification and change in specific volume does not take place under the same heat and pressure in the absence of a plasticizing agent nor under the same pressure without heat but with the same amount of plasticizer. We also find that conversion of these compounds to such vitreous or resin-like condition contributes to, and is believed to be an essential to, plastic flow in the mold and to optimum water resistance and other desired properties in the molded products.

We claim:

1. The process of producing a hard, dense material which consists in subjecting a mixture of calcium salt of lignin-suphonic acid, substantially free from non-ligneous organic matter and containing approximately 32 parts of sulphur in the sulphonic group to 600 parts of lignin substance and a lime content in large excess over that required to form a salt with the sulphonic group present, and a plasticizing agent therefor to pressure at a temperature above 100° C.

2. The process of claim 1 in which the pressure and temperature conditions are so applied to the mixture as to permit retention in the material of a sufficient quantity of the plasticizing agent as to produce a product which can be reformed under heat and pressure.

3. The process of claim 1 in which the salt of lignin-sulphonic acid before subjecting to heat and pressure is partially desulphonated by being heated above 100° C. under alkaline conditions whereby its solubility in water and acids is reduced.

4. The process of plasticizing and treating lignin-sulphonic acid compounds characterized in that a mixture which comprises a solid phase lignin-sulphonic acid compound resulting from an alkaline heat treatment of a salt of such acid, said compound having substantially less than 32 parts of sulphur in the sulphonic group to 600 parts of lignin substance and substantially free from the non-ligneous organic matter of waste sulphite liquor, and a plasticizing agent therefor, is subjected to simultaneous heat and pressure at a temperature above 100° C., such heat and pressure being maintained while confining the mixture and controlling the retention of plasticizing material therein until the lignin-sulphonic acid compound is altered to a substantially homogeneous, vitrified or resin-like condition.

5. The process of claim 4 characterized further in that the solid phase lignin-sulphonic acid compound has been obtained by heating a solution of a sodium salt of such acid above 100° C. under alkaline conditions maintained with caustic soda, and thereafter acidifying the solution.

6. The process of claim 4 characterized further in that the plasticizing agent is water to the amount of 2 to 20 percent by weight of the mixture.

7. The process of claim 4 characterized further in that the plasticizing agent contains glycerol.

8. The process of claim 4 characterized further in that the plasticizing agent contains xylenol.

9. A composition of matter in vitrified, resin-like condition and obtained by subjecting to heat and pressure at a temperature above 100° C. a mixture which contains a plasticizing agent and a compound produced by partially desulphonating a salt of lignin-sulphonic acid substantially free from non-ligneous organic matter.

10. A composition of claim 9 in which the partial desulphonation has been effected by a process which includes heating under alkaline conditions of the salt of lignin-sulphonic acid.

11. A composition of matter in vitrified, resin-like condition and obtained by subjecting to heat and pressure a mixture containing a plasticizing agent and a solid lignin-sulphonic acid compound de-sulphonated to a condition of sulphonation lower than that represented by 32 parts of sulphur in the sulphonic group to 600 parts of lignin substance, said compound having been derived from waste sulphite liquor by a process which includes precipitation with caustic lime, separation from non-ligneous organic matter, and heating above 100° C. under alkaline conditions.

12. A composition of claim 11 in which the alkaline conditions for effecting the partial de-sulphonation have been maintained with caustic lime.

13. A composition of claim 11 in which the alkaline conditions for effecting the partial de-sulphonation have been maintained with caustic soda.

14. A composition of claim 11 in which the lignin-sulphonic acid compound after the partial de-sulphonation has been leached with dilute acid.

15. A composition of claim 11 in which the plasticizing agent is water in an amount between 2 and 20 percent by weight of the composition.

16. A composition of claim 11 in which the plasticizing agent contains glycerol.

17. A composition of claim 11 in which the plasticizing agent contains xylenol.

18. A composition of claim 11 in which the plasticizing agent is present in sufficient quantity to enable the composition to be reformed by application thereto of pressure and heat.

19. A molding composition comprising a filler, a plasticizing agent and finely divided, vitrified, resin-like material which has been derived from waste sulphite liquor by a process which includes precipitation with caustic lime of a salt of lignin-sulphonic acid and with substantially complete separation from the non-ligneous organic constituents of such liquor, converting said composition by pressure at a temperature above 100° C. into a water resistant mass or body of vitrified resin-like matter and comminuting said mass or body.

20. A molding composition comprising a filler, a plasticizing agent and a finely divided, vitrified material which has been derived from waste sulphite liquor by a process which includes precipitation with caustic lime of a lignin-sulphonic acid compound and its separation from non-ligneous organic matter and heating said compound above 100° C. under alkaline conditions, converting the resulting material by pressure at a temperature above 100° C. into a body of vitrified, resin-like substance, and comminuting said body.

21. A composition of claim 9 in which the plasticizing agent is glycerol.

22. A composition of claim 9 in which the plasticizing agent is xylenol.

23. A composition of matter obtained by subjecting to pressure and heat at a temperature above 100° C. a mixture which contains xylenol and a lignin-sulphonic acid compound in vitrified condition and which has been derived from waste sulphite liquor by a process which includes precipitation with caustic lime, separation from non-ligneous organic matter and heating under alkaline conditions.

24. The process of plasticizing and treating lignin-sulphonic acid compounds characterized in that a mixture which contains a solid phase lignin-sulphonic acid compound resulting from an alkaline heat treatment of a salt of such acid, such heat treatment having been followed by a leaching with dilute acid, said compound having substantially less than 32 parts of sulphur in the sulphonic group to 600 parts of lignin substance and substantially free from the non-ligneous organic matter of waste sulphite liquor, and a plasticizing agent therefor, is subjected to simultaneous heat and pressure at a temperature above 100° C., such heat and pressure being maintained while confining the mixture and controlling the retention of plasticizing material therein until the lignin-sulphonic acid compound is altered to a substantially homogeneous, vitrified or resin-like condition.

25. A molding composition comprising a filler, a plasticizing agent and a solid lignin-sulphonic acid compound which has been derived from waste sulphite liquor by a treatment which includes precipitation with caustic lime, of a salt of lignin-sulphonic acid and with substantially complete separation from the non-ligneous organic constituents of such liquor, said composition being moldable under pressure and at a temperature above 100° C. into a hard, dense body.

26. A molding composition comprising a filler, a plasticizing agent and a solid lignin-sulphonic acid compound which has been derived from waste sulphite liquor by a treatment which includes precipitation with caustic lime of a lignin-sulphonic acid compound and its separation from non-ligneous organic matter and heating said compound above 100° C. under alkaline conditions, said composition being moldable under pressure and at a temperature above 100° C. into a hard, dense body.

GUY C. HOWARD.
LLOYD T. SANDBORN.

CERTIFICATE OF CORRECTION.

Patent No. 2,077,884.  April 20, 1937.

GUY C. HOWARD, ET AL.

It is hereby certified that error appears in the printed specification of the above numbered patent requiring correction as follows: Page 3, first column, line 5, for "about" read above; and that the said Letters Patent should be read with this correction therein that the same may conform to the record of the case in the Patent Office.

Signed and sealed this 29th day of June, A. D. 1937.

(Seal)

Henry Van Arsdale
Acting Commissioner of Patents.

non-ligneous organic matter and heating under alkaline conditions.

24. The process of plasticizing and treating lignin-sulphonic acid compounds characterized in that a mixture which contains a solid phase lignin-sulphonic acid compound resulting from an alkaline heat treatment of a salt of such acid, such heat treatment having been followed by a leaching with dilute acid, said compound having substantially less than 32 parts of sulphur in the sulphonic group to 600 parts of lignin substance and substantially free from the non-ligneous organic matter of waste sulphite liquor, and a plasticizing agent therefor, is subjected to simultaneous heat and pressure at a temperature above 100° C., such heat and pressure being maintained while confining the mixture and controlling the retention of plasticizing material therein until the lignin-sulphonic acid compound is altered to a substantially homogeneous, vitrified or resin-like condition.

25. A molding composition comprising a filler, a plasticizing agent and a solid lignin-sulphonic acid compound which has been derived from waste sulphite liquor by a treatment which includes precipitation with caustic lime, of a salt of lignin-sulphonic acid and with substantially complete separation from the non-ligneous organic constituents of such liquor, said composition being moldable under pressure and at a temperature above 100° C. into a hard, dense body.

26. A molding composition comprising a filler, a plasticizing agent and a solid lignin-sulphonic acid compound which has been derived from waste sulphite liquor by a treatment which includes precipitation with caustic lime of a lignin-sulphonic acid compound and its separation from non-ligneous organic matter and heating said compound above 100° C. under alkaline conditions, said composition being moldable under pressure and at a temperature above 100° C. into a hard, dense body.

GUY C. HOWARD.
LLOYD T. SANDBORN.

CERTIFICATE OF CORRECTION.

Patent No. 2,077,884.  April 20, 1937.

GUY C. HOWARD, ET AL.

It is hereby certified that error appears in the printed specification of the above numbered patent requiring correction as follows: Page 3, first column, line 5, for "about" read above; and that the said Letters Patent should be read with this correction therein that the same may conform to the record of the case in the Patent Office.

Signed and sealed this 29th day of June, A. D. 1937.

(Seal)

Henry Van Arsdale
Acting Commissioner of Patents.

CERTIFICATE OF CORRECTION.

Patent No. 2,077,884. April 20, 1937.

GUY C. HOWARD, ET AL.

It is hereby certified that error appears in the printed specification of the above numbered patent requiring correction as follows: Page 3, first column, line 5, for "about" read above; and that the said Letters Patent should be read with this correction therein that the same may conform to the record of the case in the Patent Office.

Signed and sealed this 29th day of June, A. D. 1937.

(Seal)

Henry Van Arsdale
Acting Commissioner of Patents.